Aug. 19, 1924.

C. F. HERM 1,505,389

FILM REEL DEVICE

Filed Dec. 28, 1921  2 Sheets-Sheet 1

INVENTOR
*Charles F. Herm.*
BY
ATTORNEY

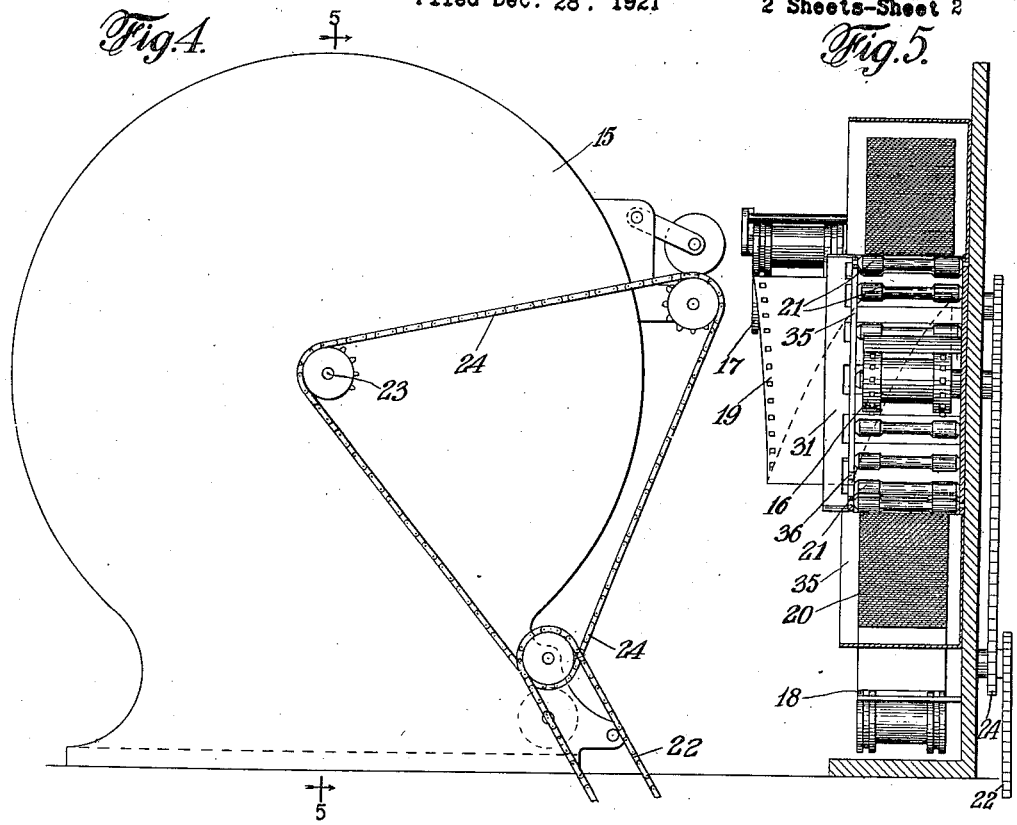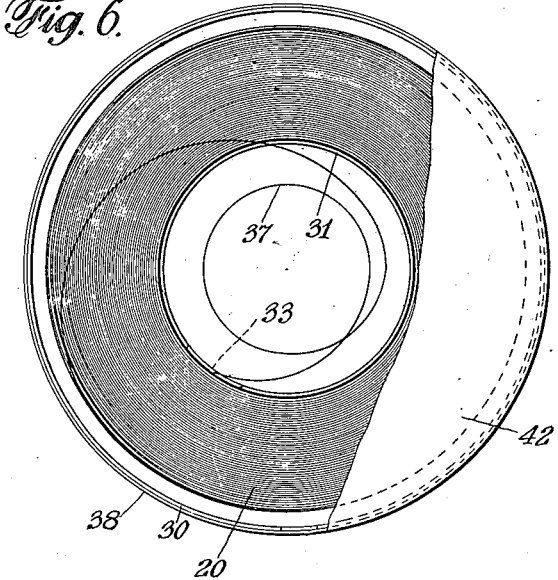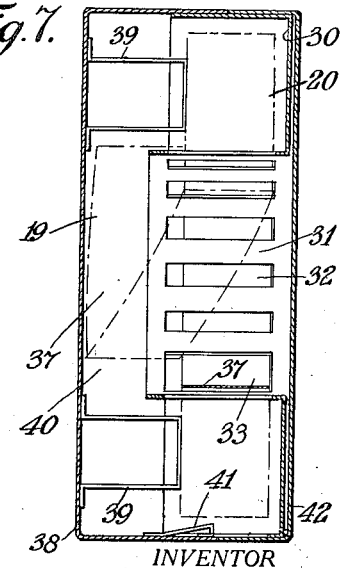

Patented Aug. 19, 1924.

1,505,389

UNITED STATES PATENT OFFICE.

CHARLES F. HERM, OF PELHAM, NEW YORK.

FILM-REEL DEVICE.

Application filed December 28, 1921. Serial No. 525,387.

*To all whom it may concern:*

Be it known that I, CHARLES F. HERM, a citizen of the United States, and a resident of Pelham, in the county of Westchester and State of New York, have invented certain new and useful Improvements in Film-Reel Devices, of which the following is a specification.

The invention relates to motion picture apparatus for use in exhibiting pictures, advertising signs, texts, announcements and the like and in the manufacture of same; and more particularly to apparatus of the character in which the film employed is in the nature of an endless band.

It is the object of the invention to provide means for a film of this character which shall render a film immediately ready for use, similarly to the usual film, for example, by insertion of a suitable carrier for the film into a magazine or the like; the film, moreover, requiring no rewinding, so that recurrent exhibition may be had therewith, the pictures appearing in regular order. This will obviate mistakes in winding of the film, as the same may be originally prepared by those having the proper knowledge and skilled in the art, with film loop, the necessary twist therein and with ends sealed together, so that the film may be distributed for use in the usual manner.

Further objects of the invention consist in the construction of a novel film carrier for this particular type of film and in the arrangement of the means for withdrawing the film from its reel and of returning the same thereto.

Projection apparatus of standard or any desired construction may be utilized with a substitution merely of the novel film reel device therein; and it will be understood, of course, that the usual take-up magazine and reel will be dispensed with. The film may be used for the projection of either motion or still pictures.

The nature of the invention, however, will best be understood when described in connection with the accompanying drawings, in which—

Fig. 4 is a rear elevation of the reel device; and Fig. 5 a vertical section therethru, with parts omitted, and taken on the line 5—5, Fig. 4, looking in the direction of the arrows.

Fig. 6 is a plan of a case for the film carrier with portion thereof broken away.

Fig. 7 is a vertical section therethru.

Similar characters of reference designate corresponding parts thruout the several views.

Figure 1:
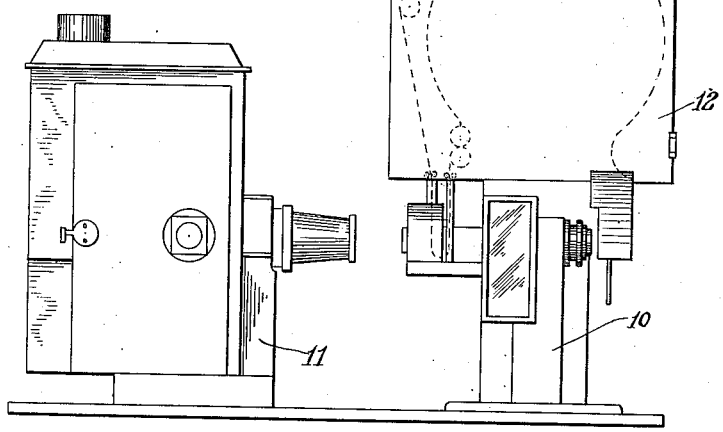
Fig. 1 is a view, in elevation, of projecting apparatus with the improved film reel device installed.

Referring to the drawings, 10 designates projection apparatus of any standard or special type, including a lamp-house 11 and a magazine 12, the latter being designed to retain the improved film reel device. This device is shown more particularly in Figs. 2 to 5; and may consist of a suitable head or frame 15 which is to be mounted in the magazine 12 and has centrally disposed thereon a feed sprocket 16. In addition, the head may carry, also, a take-up sprocket 17 and return sprocket 18 for the film strip 19, which is to be taken from the inner convolution of the film reel 20 and returned to the outer convolution in manner hereinafter set forth.

Figures 2, 3:
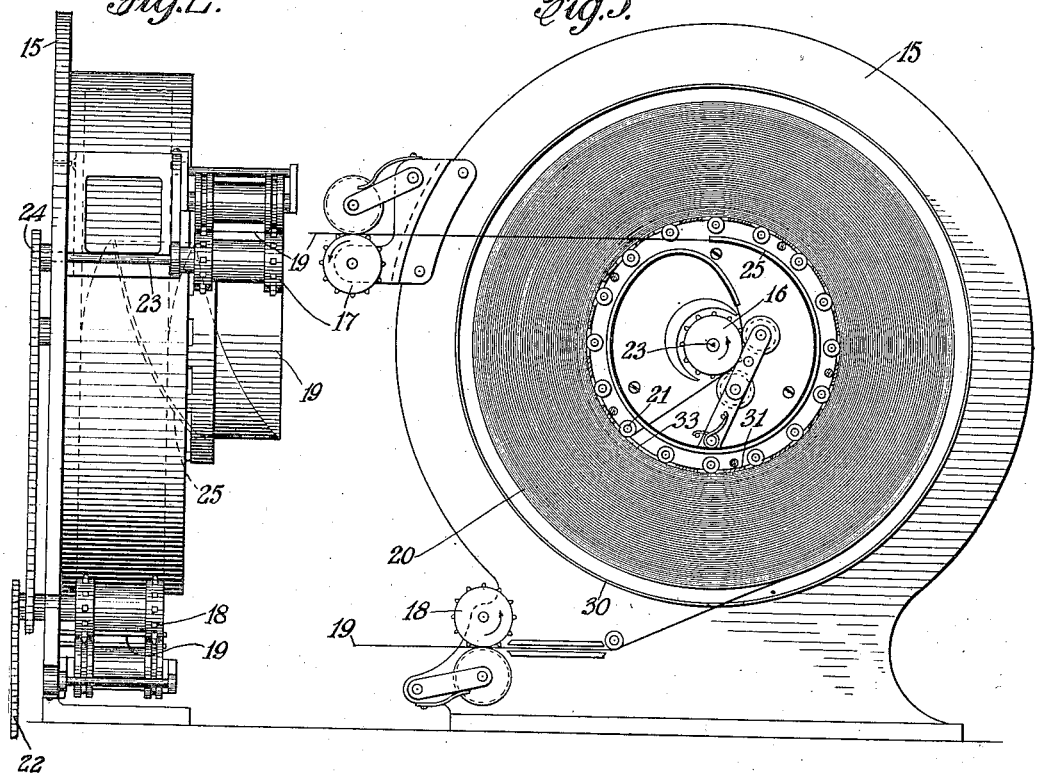
Fig. 2 is a side elevation of the improved film reel device.
Fig. 3 a front elevation thereof.

To this end, there is mounted on the head and coaxially about the sprocket 16 a plurality of separated and annularly disposed rollers 21, forming a support for the film reel 20, as shown more clearly in Fig. 3 of the drawings. The film strip 19 is arranged to be positively withdrawn from the inner convolution of the film reel 20 over one of the rollers and between a pair of same by the sprocket 16 as the latter is rotated, the film being payed out from within the rollers 21 and guided outwardly to the take-up sprocket 17 from which it passes out of the magazine 12, thru the projecting apparatus 10 and back to the return sprocket 18, as indicated in Fig. 1. It is preferred to operate these various sprockets 16, 17 and 18 simultaneously from a common source of power, as the main drive mechanism of the projector (not shown), for example thru a chain 22. For this purpose, the shaft 23, of the sprocket 16, as well as the shafts of the other sprockets, carry additional sprockets and are interconnected by means of a chain 24 with the driving chain 22. There is provided, furthermore, a flanged guide strip 25 extending helically outwardly from within the rollers 21 for directing the film laterally from the said rollers and to the sprocket 17, whereby the said film will be caused to clear the rollers.

In order to provide for convenient insertion of a film reel 20 within the reel device and to enable the same to be previously prepared for such insertion, as well as to admit of its being compactly stored within a suitable container or carrier, as for transportation and distribution, the film may be arranged on a suitable carrier member. For example, such carrier may consists of a head 30 having a slotted cylindrical spool 31 upon which the film reel 20 will be wound, the slots 32 of the spool being designed to register with the respective rollers 21 when the spool is placed thereover, as shown in Fig. 3. The diameters of the annular series of rollers and spool are such that the said rollers when cooperating with the spool will extend slightly beyond the periphery thereof, thru the intermediate slots, and thus bear upon the innermost convolution of the film reel 20, thereby affording a frictionless, temporary support for the said convolution as it is withdrawn by sprocket 16. The film strip 19, as shown, passes thru one of these slots 32, for example the slot 33, which is preferably made wider than the remaining ones for this purpose, and over a roller 21 thru the space between the two successive rollers. In this manner, the film reel 20 may be previously wound in proper manner upon the spool 31, with the twist necessary for a film of endless type and with its ends secured together so that the film, when it is received is ready for use in the projector, it being necessary merely to slide the spool 31 over the rollers 21 and bring the strip 19 thru a space between same.

In order to permit of this insertion of the film strip, the series of rollers may be mounted between two frame pieces 35 and the outer of which is provided with an opening or slit 36 to admit the film to the interior of the reel device, with spool 31 mounted over the rollers.

It will be apparent, that with the film thus prepared, there will be a loop portion 37, Fig. 7, extending laterally from the spool and which must be accommodated in a container or carrying case 38, which may be provided for the reel carrier. For example, the case may be provided with uprights 39 designed to contact with the face of the reel to prevent the spool and strip from bottoming in the case, and affording a free space or chamber 40 within which the film loop will be accommodated. It is desirable, moreover, to prevent rotation of the carrier 30 within its case 38; and, to this end, suitable locking means 41 is provided to hold the two against relative rotational movement so that the loop may not become torn.

In order, furthermore, to close over the film carrier 30 with film reel wound thereon, a cover member 42 is fitted over same to cooperate with the case 38, thereby sealing the entire case and conforming same to the underwriters' regulations.

I claim:—

1. A reel device for endless films, comprising separable heads, one of which is adapted to carry a film roll, means on the other for supporting the film roll, and means for withdrawing film therefrom.

2. A reel device for endless films, comprising separable heads, one of which is adapted to carry a film roll, means on the other for supporting the film roll, and means for withdrawing film from the inner convolution thereof.

3. A reel device for endless films, comprising separable heads, one of which is adapted to carry a film roll, means on the other for supporting the film roll, and means for withdrawing film from the inner convolution thereof and for returning the film to the upper convolution thereof.

4. A two part reel device for endless films, one part consisting of a fixed film support, and driving mechanism in connection therewith, and the other part consisting of a removable film carrier to fit the fixed support, means on the latter to support the film of the carrier, and film withdrawing means carried by the support to engage the said film.

5. A two part reel device for endless films, one part consisting of a fixed film support adapted for insertion into a film magazine, and the other part consisting of a removable film carrier to fit the fixed support, means on the latter to support the film of the carrier, and sprockets simultaneously operable to withdraw the film from the reel and to return same thereto.

6. A two part reel device for endless films, one part consisting of a fixed film support adapted for insertion into a film magazine, and the other part consisting of a removable film carrier to fit the fixed support, means on the latter to support the film of the carrier, and a feed sprocket, a take-up sprocket and a return sprocket carried by the fixed support, simultaneously operable and adapted to withdraw film from the reel and to return same thereto.

7. A reel device for endless films, comprising separable heads for the film reel, a slotted cylindrical spool on one head and upon which spool the film reel is carried, an annular series of anti-friction members carried by the other head and adapted to fit within the respective slots of said cylindrical spool of the one head to support the film, and means to withdraw film from the reel.

8. A reel device for endless films, comprising separable heads for the film reel, a slotted cylindrical spool on one head and upon which spool the film reel is carried, an annular series of anti-friction members carried by the other head and adapted to fit within the respective slots of said cylindrical spool of the one head to support the film, and means located within the annular series of anti-friction members to withdraw film from the reel.

9. A reel device for endless films, comprising separable heads for the film reel, a slotted cylindrical spool on one head and upon which spool the film reel is carried, an annular series of film supporting rollers mounted on the other head and adapted to fit within the respective slots of said cylindrical spool of the one head to support the film, and means to withdraw film from the reel.

10. A reel device for endless films, comprising separable heads for the film reel, a slotted cylindrical spool on one head and upon which spool the film reel is carried, an annular series of film supporting rollers mounted on the other head and adapted to fit within the respective slots of said cylindrical spool of the one head to support the film, and means to withdraw film from the reel, the film at the inner convolution passing thru a said slot and between two rollers.

11. A reel device for endless films, comprising separable heads for the film reel, a slotted cylindrical spool on one head and upon which spool the film reel is carried, an annular series of anti-friction members carried by the other head and adapted to fit within the respective slots of said cylindrical spool of the one head to support the film, and a feed sprocket to receive the film and mounted within the anti-friction members.

12. A reel device for endless films, comprising separable heads for the film reel, a slotted cylindrical spool on one head and upon which spool the film reel is carried, an annular series of anti-friction members carried by the other head and adapted to fit within the respective slots of said cylindrical spool to receive the film, a feed sprocket to receive the film and mounted within the anti-friction members, and means to guide the film laterally from said feed sprocket.

13. A reel for an endless film, comprising a pair of frame members, a plurality of rollers held between same, supporting the film and providing film openings therebetween thru one of which a film strip may pass, one of said frame members also being provided with an opening to admit the film strip, and a film carrier for mounting the film upon said rollers and consisting of a head, a hollow cylindrical hub, axially slotted and adapted to register with said rollers and to fit thereover.

14. A case for an endless film reel with loop, comprising projecting members, located within same to support the face of the film reel, and providing a compartment for the loop thereof.

15. A case for a carrier for an endless film reel, comprising a support for the carrier, and means to secure the carrier against rotation relatively to the case.

16. A case for a carrier for an endless film reel with loop, comprising a support for the carrier and affording a compartment for the loop, and means to secure the carrier against rotation relatively to the case.

Signed at New York, in the county of New York and State of New York, this 24th day of December A. D. 1921.

CHARLES F. HERM.